(12) United States Patent
Nishihiro et al.

(10) Patent No.: US 12,397,647 B2
(45) Date of Patent: Aug. 26, 2025

(54) POWER SUPPLY DEVICE FOR VEHICLE AND CONTROL METHOD FOR THE SAME

(71) Applicants: JATCO Ltd, Fuji (JP); NISSAN MOTOR CO., LTD., Yokohama (JP)

(72) Inventors: Yoshimasa Nishihiro, Zama (JP); Masahiko Tahara, Yokosuka (JP); Masaharu Mochizuki, Atsugi (JP); Takurou Hirano, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 831 days.

(21) Appl. No.: 17/614,924

(22) PCT Filed: Jun. 1, 2020

(86) PCT No.: PCT/JP2020/021631
§ 371 (c)(1),
(2) Date: Nov. 29, 2021

(87) PCT Pub. No.: WO2020/255691
PCT Pub. Date: Dec. 24, 2020

(65) Prior Publication Data
US 2022/0242246 A1    Aug. 4, 2022

(30) Foreign Application Priority Data

Jun. 21, 2019   (JP) .................... 2019-115815

(51) Int. Cl.
*B60L 58/20* (2019.01)
*B60L 3/00* (2019.01)
(Continued)

(52) U.S. Cl.
CPC ............ *B60L 3/0046* (2013.01); *B60L 58/20* (2019.02); *H02J 1/086* (2020.01); *H02J 7/14* (2013.01);
(Continued)

(58) Field of Classification Search
CPC ........ B60L 3/0046; B60L 58/20; H02J 1/086; H02J 7/1423; H02J 7/14
(Continued)

(56) References Cited

U.S. PATENT DOCUMENTS

| | | | |
|---|---|---|---|
| 5,397,991 A * | 3/1995 | Rogers | H02J 7/0049 324/427 |
| 5,488,283 A * | 1/1996 | Dougherty | H01M 10/122 320/145 |

(Continued)

FOREIGN PATENT DOCUMENTS

| | | | |
|---|---|---|---|
| JP | 2009179311 A | * | 8/2009 |
| JP | 2012121570 A | * | 6/2012 |

(Continued)

OTHER PUBLICATIONS

China Patent Office Action for patent family member CN 113993732 A, Mar. 2024 (Year: 2024).*

(Continued)

*Primary Examiner* — John T Trischler
(74) *Attorney, Agent, or Firm* — Foley & Lardner LLP (57) ABSTRACT

The power supply device includes a low voltage battery, a high voltage battery, a starter generator, a DC-DC converter, a changeover switch, and a controller. When an abnormality or a failure has occurred in the DC-DC converter, the controller controls the changeover switch to connect the starter generator to the other battery without via the DC-DC converter and controls the output of the starter generator corresponding to the connected other battery.

5 Claims, 5 Drawing Sheets (51) Int. Cl.
*H02J 1/08* (2006.01)
*H02J 7/14* (2006.01)
*B60K 6/28* (2007.10)
*B60L 50/60* (2019.01)
*B60W 10/26* (2006.01)
*B60W 20/00* (2016.01)
*B60W 20/13* (2016.01)
*H02J 7/00* (2006.01)

(52) U.S. Cl.
CPC ............. *H02J 7/1423* (2013.01); *B60K 6/28* (2013.01); *B60L 50/60* (2019.02); *B60L 2210/12* (2013.01); *B60L 2210/14* (2013.01); *B60W 10/26* (2013.01); *B60W 20/00* (2013.01); *B60W 20/13* (2016.01); *B60Y 2200/92* (2013.01); *H02J 1/082* (2020.01); *H02J 7/0048* (2020.01)

(58) Field of Classification Search
USPC ........................................................ 320/137
See application file for complete search history.

(56) References Cited

U.S. PATENT DOCUMENTS

| | | | | |
|---|---|---|---|---|
| 5,602,459 | A * | 2/1997 | Rogers | H02J 7/1423 320/160 |
| 5,610,499 | A * | 3/1997 | Rogers | G01R 31/3832 320/137 |
| 6,218,643 | B1 * | 4/2001 | Iwata | F01N 3/2013 219/508 |
| 6,466,024 | B1 * | 10/2002 | Rogers | H02J 7/007192 60/284 |
| 6,630,810 | B2 * | 10/2003 | Takemasa | B60L 58/10 903/903 |
| 6,815,931 | B1 * | 11/2004 | Wells | H02J 7/1423 320/155 |
| 7,215,034 | B2 * | 5/2007 | Hino | H02J 1/08 290/40 C |
| RE40,820 | E * | 7/2009 | Rogers | B60L 58/20 324/427 |
| 7,772,806 | B2 * | 8/2010 | Kitanaka | B60L 58/20 320/140 |
| 8,030,880 | B2 * | 10/2011 | Alston | H02J 7/1423 320/103 |
| 8,134,485 | B2 * | 3/2012 | Tamura | H02J 7/0048 341/120 |
| 8,305,043 | B2 * | 11/2012 | Yamamoto | G01R 19/0084 324/426 |
| 8,508,066 | B2 * | 8/2013 | Lee | B60L 50/51 307/9.1 |
| 8,543,271 | B2 * | 9/2013 | Yamamoto | B60W 10/26 180/65.265 |
| 8,627,914 | B2 * | 1/2014 | Berbari | B60L 50/30 180/165 |
| 8,681,457 | B2 * | 3/2014 | Minegishi | B60K 6/365 318/434 |
| 8,703,311 | B2 * | 4/2014 | Sawaguchi | B60L 58/27 429/62 |
| 8,957,623 | B2 * | 2/2015 | Sisk | H01M 10/48 320/101 |
| 9,283,855 | B2 * | 3/2016 | Kamioka | B60L 50/16 |
| 9,300,018 | B2 * | 3/2016 | Watson | H01M 10/441 |
| 9,302,671 | B2 * | 4/2016 | Yamazaki | B60W 10/08 |
| 9,425,492 | B2 * | 8/2016 | Mao | H01M 10/4264 |
| 9,676,292 | B2 * | 6/2017 | Orita | B60W 20/00 |
| 9,819,064 | B2 * | 11/2017 | Jiang | H01M 10/06 |
| 9,862,275 | B2 * | 1/2018 | Cha | B60L 58/14 |
| 9,889,753 | B2 * | 2/2018 | Yun | B60L 58/20 |
| 9,944,199 | B2 * | 4/2018 | Tahara | B60R 16/033 |
| 10,119,513 | B2 * | 11/2018 | Tahara | B60L 50/16 |
| 10,144,373 | B2 * | 12/2018 | Tahara | B60R 16/03 |
| 10,158,152 | B2 * | 12/2018 | Watson | B60L 3/04 |
| 10,164,522 | B2 * | 12/2018 | Kashyap | B60L 53/20 |
| 10,173,546 | B2 * | 1/2019 | Saito | H02J 7/0013 |
| 10,290,912 | B2 * | 5/2019 | Jiang | H01M 50/296 |
| 10,322,824 | B1 * | 6/2019 | Demont | B64F 5/60 |
| 10,458,317 | B2 * | 10/2019 | Cade | F02B 39/10 |
| 10,479,223 | B2 * | 11/2019 | Demont | B64F 5/60 |
| 10,576,843 | B2 * | 3/2020 | Demont | B60L 53/00 |
| 10,611,257 | B2 * | 4/2020 | Moriya | B60W 10/06 |
| 10,686,230 | B2 * | 6/2020 | Colasacco | H02J 7/1423 |
| 10,774,801 | B2 * | 9/2020 | Kinoshita | F02N 11/0866 |
| 10,784,697 | B2 * | 9/2020 | Koishi | H02J 7/0047 |
| 10,804,733 | B2 * | 10/2020 | Koike | H01M 10/46 |
| 10,807,496 | B2 * | 10/2020 | Shimizu | F02N 11/0866 |
| 10,994,596 | B2 * | 5/2021 | Yukawa | B60L 15/007 |
| 11,059,386 | B2 * | 7/2021 | Demont | B64F 5/60 |
| 11,065,979 | B1 * | 7/2021 | Demont | B64F 5/60 |
| 11,084,380 | B2 * | 8/2021 | Seta | B60W 10/26 |
| 11,135,932 | B2 * | 10/2021 | Ishida | B60L 53/16 |
| 11,235,714 | B2 * | 2/2022 | Cha | B60R 16/02 |
| 11,309,578 | B2 * | 4/2022 | Koike | H01M 10/44 |
| 11,565,603 | B2 * | 1/2023 | Koishi | H02J 7/14 |
| 11,685,290 | B2 * | 6/2023 | Demont | G05B 19/0428 701/3 |
| 11,697,358 | B2 * | 7/2023 | Demont | H02P 29/025 701/3 |
| 11,766,927 | B2 * | 9/2023 | Nishihiro | B60W 10/26 180/65.26 |
| 11,964,587 | B2 * | 4/2024 | Yukawa | B60K 6/48 |
| 2003/0117113 | A1 * | 6/2003 | Takemasa | B60L 58/10 903/903 |
| 2006/0038406 | A1 | 2/2006 | Hino et al. | |
| 2009/0015199 | A1 * | 1/2009 | Kitanaka | H02J 7/00309 320/118 |
| 2009/0107743 | A1 * | 4/2009 | Alston | B60H 1/00428 903/906 |
| 2009/0251103 | A1 * | 10/2009 | Yamamoto | B60L 58/24 324/426 |
| 2010/0300646 | A1 * | 12/2010 | Sawaguchi | B60L 58/27 165/51 |
| 2011/0043393 | A1 * | 2/2011 | Tamura | H02J 7/0025 341/118 |
| 2011/0087395 | A1 * | 4/2011 | Yamamoto | B60W 10/26 701/22 |
| 2011/0095603 | A1 * | 4/2011 | Lee | B60L 50/51 307/10.1 |
| 2011/0198920 | A1 * | 8/2011 | Komuro | H02J 7/1438 903/930 |
| 2012/0013182 | A1 * | 1/2012 | Minegishi | B60L 50/61 307/9.1 |
| 2012/0049771 | A1 * | 3/2012 | Komatsu | B60W 10/28 318/139 |
| 2012/0235473 | A1 * | 9/2012 | Jiang | B60L 58/20 307/9.1 |
| 2012/0235511 | A1 * | 9/2012 | Watson | H02J 7/0048 307/109 |
| 2012/0235624 | A1 * | 9/2012 | Sisk | B60L 50/40 320/167 |
| 2012/0235642 | A1 * | 9/2012 | Mao | B60L 3/04 320/112 |
| 2012/0237799 | A1 * | 9/2012 | Jiang | B60L 3/04 429/7 |
| 2013/0119665 | A1 * | 5/2013 | Berbari | B60L 58/20 290/50 |
| 2013/0119759 | A1 * | 5/2013 | Kamioka | B60L 50/16 903/903 |
| 2014/0091573 | A1 * | 4/2014 | Berbari | B60L 50/40 290/45 |
| 2015/0210271 | A1 * | 7/2015 | Yamazaki | B60L 58/21 180/65.265 |
| 2016/0137078 | A1 * | 5/2016 | Yun | B60L 50/13 307/10.1 |
| 2016/0176298 | A1 * | 6/2016 | Watson | B60L 58/20 307/10.6 |
| 2016/0214503 | A1 * | 7/2016 | Orita | B60L 50/66 |
| 2016/0303976 | A1 * | 10/2016 | Cha | B60L 50/16 |
| 2017/0158082 | A1 * | 6/2017 | Tahara | B60L 3/04 |
| 2017/0187316 | A1 | 6/2017 | Kobayashi | |

(56) References Cited

U.S. PATENT DOCUMENTS

| | | | | |
|---|---|---|---|---|
| 2017/0232861 | A1* | 8/2017 | Saito | H02M 3/04 |
| | | | | 307/10.1 |
| 2017/0274798 | A1* | 9/2017 | Colasacco | H01M 10/44 |
| 2018/0079314 | A1* | 3/2018 | Kashyap | B60L 53/20 |
| 2018/0112589 | A1* | 4/2018 | Cade | F02B 37/10 |
| 2018/0126856 | A1* | 5/2018 | Tahara | H02J 7/14 |
| 2018/0134240 | A1* | 5/2018 | Tahara | H02J 7/1446 |
| 2018/0265021 | A1* | 9/2018 | Koishi | H02J 7/0047 |
| 2018/0290557 | A1* | 10/2018 | Koishi | F02N 11/087 |
| 2018/0291857 | A1* | 10/2018 | Kinoshita | H02J 7/1423 |
| 2018/0304763 | A1* | 10/2018 | Moriya | B60W 10/26 |
| 2019/0044367 | A1* | 2/2019 | Koike | H02J 7/1423 |
| 2019/0103629 | A1* | 4/2019 | Koike | H01M 10/12 |
| 2019/0210481 | A1* | 7/2019 | Ishida | B60L 53/62 |
| 2019/0229650 | A1* | 7/2019 | Demont | B60L 3/0061 |
| 2019/0299805 | A1* | 10/2019 | Shimizu | B60K 6/48 |
| 2019/0337409 | A1* | 11/2019 | Demont | B64D 27/24 |
| 2020/0016980 | A1* | 1/2020 | Seta | B60L 50/61 |
| 2020/0262288 | A1* | 8/2020 | Yukawa | B60L 50/16 |
| 2020/0298728 | A1* | 9/2020 | Demont | B60L 53/00 |
| 2020/0309079 | A1* | 10/2020 | Watanabe | B60W 20/13 |
| 2020/0313247 | A1* | 10/2020 | Colasacco | H02J 7/1423 |
| 2021/0138906 | A1* | 5/2021 | Cha | B60L 50/60 |
| 2022/0001768 | A1* | 1/2022 | Koishi | B60L 58/20 |
| 2022/0048404 | A1* | 2/2022 | Yukawa | B60K 6/48 |
| 2022/0063443 | A1* | 3/2022 | Demont | B64D 45/00 |
| 2022/0176849 | A1* | 6/2022 | Demont | B60L 3/0061 |
| 2022/0234436 | A1* | 7/2022 | Nishihiro | H02J 7/0048 |
| 2023/0141601 | A1* | 5/2023 | Hara | H02P 27/085 |
| 2023/0211702 | A1* | 7/2023 | Lee | B60L 58/12 |
| | | | | 701/22 |
| 2024/0025297 | A1* | 1/2024 | Demont | B60L 58/20 |
| 2024/0174132 | A1* | 5/2024 | Morii | B60L 58/19 |

FOREIGN PATENT DOCUMENTS

| | | | |
|---|---|---|---|
| JP | 2013-095246 A | | 5/2013 |
| JP | 2014202135 A | * | 10/2014 |
| JP | 2017099234 A | * | 6/2017 |

OTHER PUBLICATIONS

European Patent Office Examination Opinion for patent family member EP 3988819 A1, Jul. 2022 (Year: 2022).*

European Patent Office Search report for patent family member EP 3988819 A1, Jul. 2022 (Year: 2022).*

Japan Patent Office Decision to grant patent of patent Family member JP 7108139 B2, Jun. 2022 (Year: 2022).*

* cited by examiner

POWER SUPPLY DEVICE FOR VEHICLE AND CONTROL METHOD FOR THE SAME

TECHNICAL FIELD

The present invention relates to a power supply device for a vehicle including a high voltage battery and a low voltage battery.

BACKGROUND ART

JP2013-95246A discloses a power supply device for a vehicle that includes: a low voltage battery; a high voltage battery; an alternator; and a DC-DC converter that is disposed between the low voltage battery and the high voltage battery and performs a voltage conversion.

SUMMARY OF INVENTION

The power supply device described in JP2013-95246A is configured such that the DC-DC converter steps up an output voltage of the low voltage battery and/or the voltage generated by an electric generator to charge the high voltage battery.

However, when the DC-DC converter has a failure, the charge of the high voltage battery via the DC-DC converter cannot be performed.

The present invention has been made in view of such technical problem, and it is an object of the present invention to allow a battery that is charged via a DC-DC converter to be charged even when an abnormality or a failure has occurred in the DC-DC converter.

According to one aspect of the present invention, the power supply device includes the low voltage battery, the high voltage battery, the rotating electrical machine, the DC-DC converter, the changeover switch, and the controller. The low voltage battery supplies an electric power to the electric component mounted to the vehicle. The high voltage battery is mounted to the vehicle and has an output voltage higher than the output voltage of the low voltage battery. The rotating electrical machine receives a rotational energy from the engine to generate the electric power for charging the low voltage battery and the high voltage battery. The DC-DC converter is disposed on an electric circuit connecting the low voltage battery to the high voltage battery and converts an input voltage and outputs the converted voltage. The changeover switch switches a connection of the rotating electrical machine to the low voltage battery and the high voltage battery. The controller controls the rotating electrical machine, the DC-DC converter, and the changeover switch. When the DC-DC converter is normal, the controller controls the changeover switch to connect the rotating electrical machine to any one of the batteries of the low voltage battery and the high voltage battery and connects the other battery of the low voltage battery and the high voltage battery to the rotating electrical machine via the DC-DC converter. When an abnormality or a failure has occurred in the DC-DC converter, the controller controls the changeover switch to connect the rotating electrical machine to the other battery without via the DC-DC converter and controls the output of the rotating electrical machine corresponding to the connected other battery.

According to the above-described aspect, even when an abnormality or a failure has occurred in the DC-DC converter, the battery that is charged via the DC-DC converter is allowed to be charged.

DESCRIPTION OF EMBODIMENTS

The following describes the embodiment of the present invention with reference to attached drawings.

Figure 1:
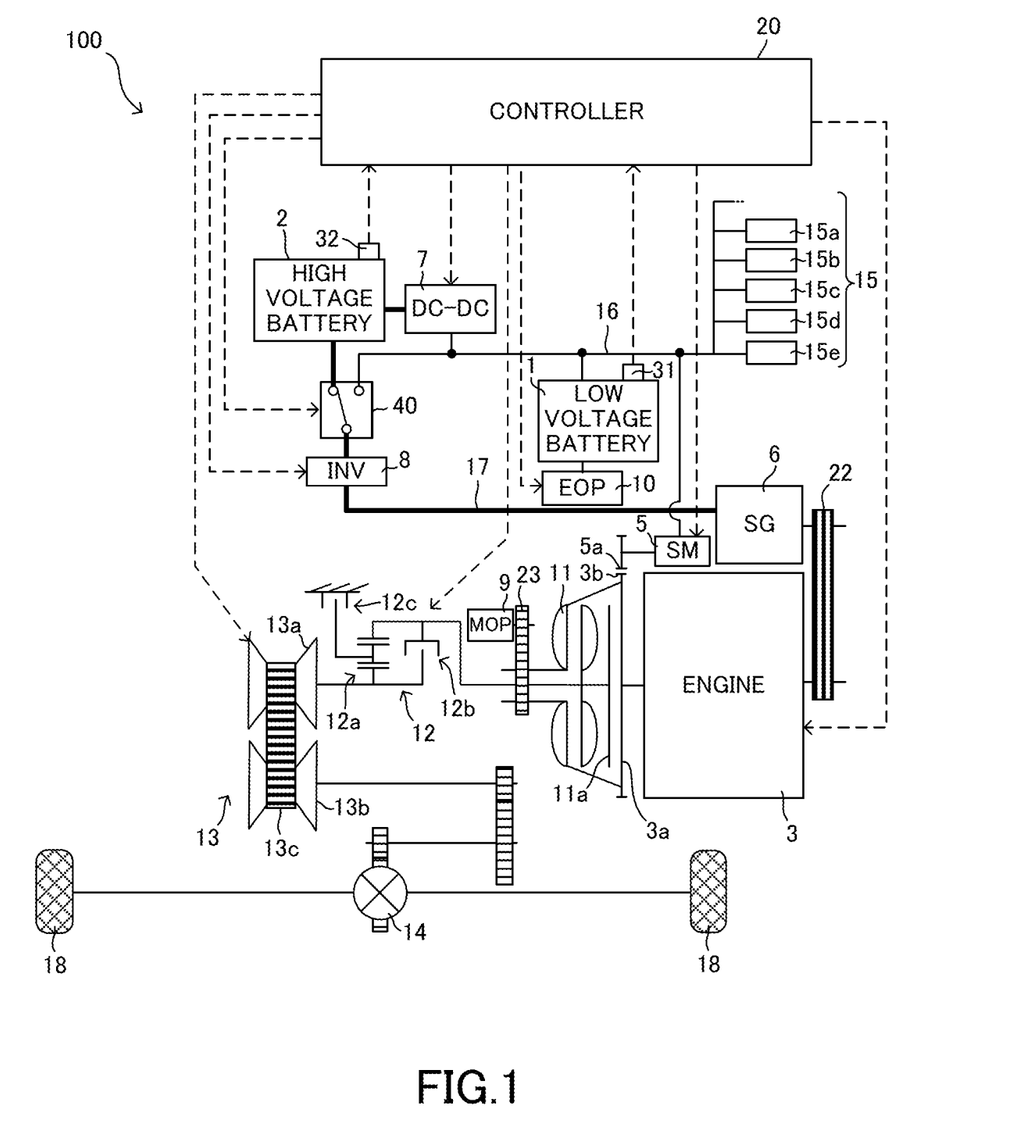
FIG. 1 is a schematic configuration diagram of a vehicle according to an embodiment.

FIG. 1 is a schematic configuration of a vehicle 100 according to the embodiment of the present invention. The vehicle 100 includes: a low voltage battery 1 as a first battery; a high voltage battery 2 as a second battery; an engine 3 as a driving source for running; a starter motor 5 (hereinafter referred to as "SM 5.") used for start of the engine 3; a starter generator 6 (hereinafter referred to as "SG 6.") as a rotating electrical machine used for electric generation and assist and start of the engine 3; a DC-DC converter 7; an inverter 8; a mechanical oil pump 9 and an electric oil pump 10 as sources of generation of a hydraulic pressure; a torque converter 11, a forward/reverse switching mechanism 12, a continuously variable transmission 13 (hereinafter referred to as "CVT 13."), and a differential mechanism 14 that constitute a power train; drive wheels 18; a controller 20 as a control device; and a changeover switch 40 as a changeover device.

Figure 2:
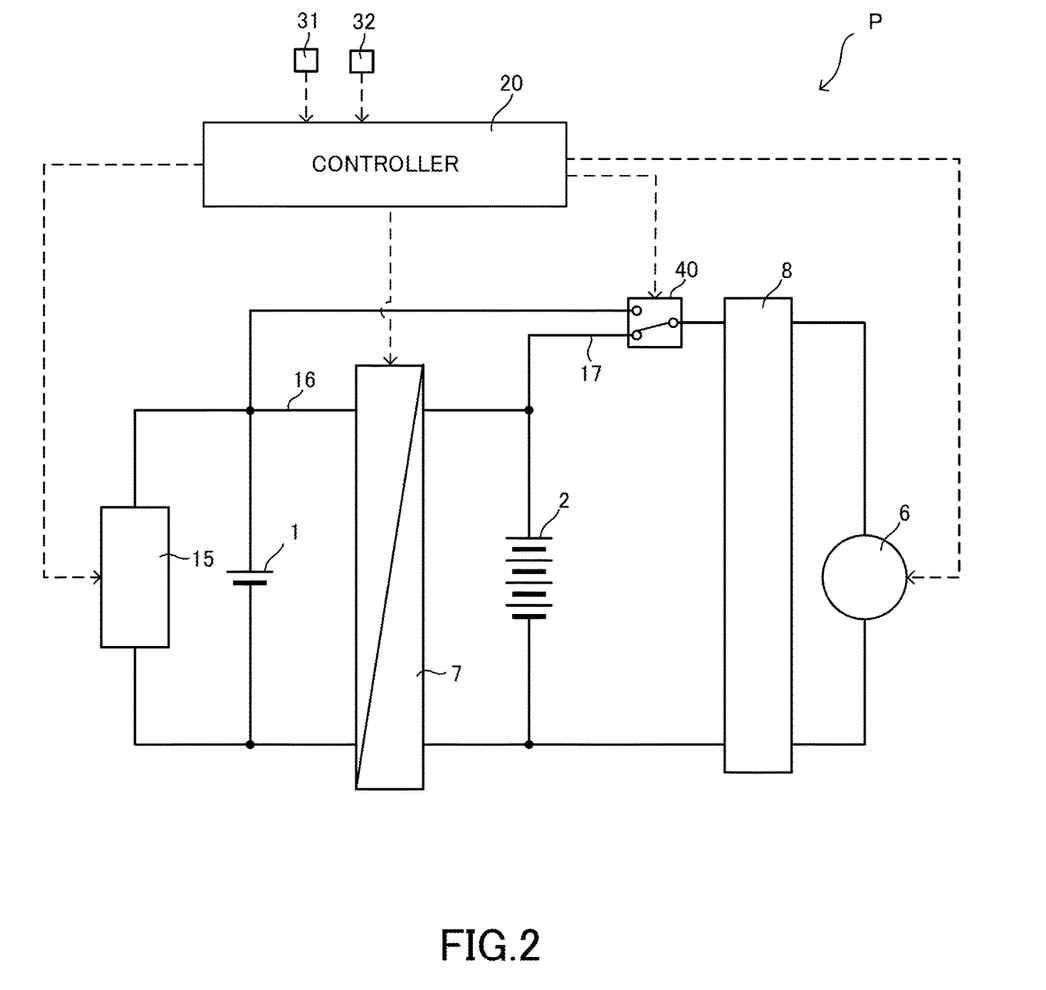
FIG. 2 is an electric circuit diagram of a power supply device according to the embodiment.

In this embodiment, the low voltage battery 1, the high voltage battery 2, the SG 6, the DC-DC converter 7, the inverter 8, the controller 20, and the changeover switch 40 constitute a power supply device P (see FIG. 2).

The low voltage battery 1 is, for example, a lead-acid battery having a nominal voltage (output voltage) of 12 V DC. The low voltage battery 1 supplies an electric power to, for example, electric components 15 (such as an automatic driving camera 15a, a sensor 15b, a navigation system 15c, an audio 15d, and an air conditioner blower 15e) that are mounted to the vehicle 100 and operate at 12 V DC, the SM 5, and the electric oil pump 10. The low voltage battery 1 is connected to a low voltage circuit 16 together with the electric component 15, the SM 5, and the electric oil pump 10. It should be noted that the low voltage battery 1 may be a lithium-ion battery.

The high voltage battery 2 is a lithium-ion battery having a nominal voltage (output voltage) of 48 V DC higher than that of the low voltage battery 1. The nominal voltage of the high voltage battery 2 may be lower or higher than this and may be, for example, 30 V DC and 100 V DC. The high voltage battery 2 is connected to a high voltage circuit 17 together with, for example, the SG 6 and the inverter 8.

The engine 3 is an internal combustion engine that uses, for example, gasoline and light oil as a fuel, and has, for example, a rotation speed and a torque to be controlled on the basis of a command from the controller 20.

The DC-DC converter 7 is disposed on an electric circuit that connects the low voltage battery 1 to the high voltage battery 2. Accordingly, the low voltage circuit 16 and high voltage circuit 17 are connected via the DC-DC converter 7. The DC-DC converter 7 converts an input voltage and outputs it. Specifically, the DC-DC converter 7 has: a step-up function that steps up 12 V DC of the low voltage circuit 16 to 48 V DC and outputs 48 V DC to the high voltage circuit 17; and a step-down function that steps down 48 V DC of the high voltage circuit 17 to 12 V DC and outputs 12 V DC to the low voltage circuit 16. The DC-DC converter 7 can output the voltage of 12 V DC to the low voltage circuit 16 regardless of during driving or stop of the engine 3. In addition, when the remaining capacity of the high voltage battery 2 becomes low, 12 V DC of the low voltage circuit 16 can be stepped up to 48 V DC to be output to the high voltage circuit 17, thus allowing charging the high voltage battery 2.

The changeover switch 40 is disposed between the inverter 8 and the low voltage battery 1 with the high voltage battery 2. The changeover switch 40 switches a connection of the SG 6 to the low voltage battery 1 or the high voltage battery 2. The changeover switch 40 is normally held at a position connecting the inverter 8 to the high voltage battery 2. Control of the changeover switch 40 will be described later.

The torque converter 11 is disposed on a power transmission path between the engine 3 and the forward/reverse switching mechanism 12 and transmits power via fluid. In addition, when the vehicle 100 runs at a predetermined lock-up vehicle speed or more, engaging a lock-up clutch 11a allows the torque converter 11 to enhance a power transmission efficiency of driving power from the engine 3.

The forward/reverse switching mechanism 12 is disposed on a power transmission path between the torque converter 11 and the CVT 13. The forward/reverse switching mechanism 12 includes a planetary gear mechanism 12a, a forward clutch 12b, and a reverse brake 12c. When the forward clutch 12b is engaged, and the reverse brake 12c is disengaged, rotation of the engine 3 input to the forward/reverse switching mechanism 12 via the torque converter 11 is output from the forward/reverse switching mechanism 12 to the CVT 13 with its rotation direction maintained. Conversely, when the forward clutch 12b is disengaged, and the reverse brake 12c is engaged, the rotation of the engine 3 input to the forward/reverse switching mechanism 12 via the torque converter 11 is decelerated and reversed to be output from the forward/reverse switching mechanism 12 to the CVT 13.

The CVT 13 is arranged on a power transmission path between the forward/reverse switching mechanism 12 and the differential mechanism 14 and steplessly changes a speed ratio corresponding to, for example, a vehicle speed and an accelerator position as an operation amount of an accelerator pedal. The CVT 13 includes a primary pulley 13a, a secondary pulley 13b, and a belt 13c wound around both the pulleys. The CVT 13 changes groove widths of the primary pulley 13a and the secondary pulley 13b by the hydraulic pressure to change contact radiuses of the pulleys 13a, 13b, and the belt 13c, which can steplessly change the speed ratio. A hydraulic pressure circuit (not illustrated) generates the hydraulic pressure required for the CVT 13 by using the hydraulic pressure generated by the mechanical oil pump 9 or the electric oil pump 10 as a source pressure.

The SM 5 is arranged such that a pinion gear 5a can be meshed with an outer peripheral gear 3b of a flywheel 3a of the engine 3. When the engine 3 starts from a cold state for the first time (hereinafter referred to as "initial start."), the electric power is supplied from the low voltage battery 1 to the SM 5, the pinion gear 5a is meshed with the outer peripheral gear 3b, and the flywheel 3a and further, a crankshaft are rotated.

It should be noted that the torque and the output required for starting the engine 3 are the largest at the initial start and are smaller at a start from a warm-up state, that is, a restart than those at the initial start. This is because while a temperature of an engine oil is low at the initial start, and a viscous resistance of the engine oil is large, after the initial activation, the temperature of the engine oil has risen, and the viscous resistance of the engine oil has been decreased. Since the SG 6 described later is driven via the belt, a large torque cannot be transmitted. In view of this, at the initial start, the engine 3 is driven by using the SM 5. It should be noted that the SM 5 may be connected to the high voltage circuit 17 to drive it by the electric power supplied from the high voltage battery 2.

The SG 6 is connected to the crankshaft of the engine 3 via a V belt 22 and functions as an electric generator when receiving rotational energy from the engine 3. The electric power thus generated charges the high voltage battery 2 via the inverter 8. Furthermore, the electric power generated by the SG 6 is stepped down by the DC-DC converter 7 to charge the low voltage battery 1.

The SG 6 operates as an electric motor that is rotatably driven by receiving the supply of the electric power from the high voltage battery 2 and generates a torque for assisting the driving of the engine 3. Furthermore, the SG 6 is used for restarting the engine 3 by rotatably driving the crankshaft of the engine 3 when the engine 3 is restarted from an idling stop state. Since the SG 6 is connected to the crankshaft of the engine 3 by the V belt 22, when the engine 3 is started, a quiet and smooth start can be performed without a mesh sound of the gears. In view of this, at the restart, the engine 3 is driven by using the SG 6.

The mechanical oil pump 9 is an oil pump that operates by the rotation of the engine 3 transmitted via a chain 23. The mechanical oil pump 9 suctions a hydraulic oil stored in an oil pan to supply the oil to the lock-up clutch 11a, the forward/reverse switching mechanism 12, and the CVT 13 via a hydraulic pressure circuit (not illustrated).

The electric oil pump 10 is an oil pump that operates by the electric power supplied from the low voltage battery 1. The electric oil pump 10 operates when the engine 3 stops, and the mechanical oil pump 9 cannot be driven by the engine 3, such as in the idling stop state. Similarly to the mechanical oil pump 9, the electric oil pump 10 suctions a hydraulic oil stored in an oil pan to supply the oil to the lock-up clutch 11a, the forward/reverse switching mechanism 12, and the CVT 13 via a hydraulic pressure circuit (not illustrated). In particular, the ensured hydraulic pressure required for the CVT 13 suppresses slipperiness of the belt 13c. The electric oil pump 10 may be an oil pump that operates by the electric power supplied from the high voltage battery 2.

The controller 20 includes one or a plurality of microcomputers including a central processing unit (CPU), a read-only memory (ROM), a random access memory (RAM), and an input/output interface (I/O interface). The controller 20 corresponds to a control device and executes a program stored in the ROM or the RAM by the CPU to integrally control, for example, the engine 3, the SM 5, the SG 6, the DC-DC converter 7, the inverter 8, the electric oil pump 10, the lock-up clutch 11a, the forward/reverse switching mechanism 12, the CVT 13, and the changeover switch 40.

In addition, the controller 20 performs a charge control of the low voltage battery 1 and the high voltage battery 2 and an electric generation control of the SG 6 on the basis of a remaining capacity SOC1 of the low voltage battery 1 detected by a first remaining capacity detector 31 and a remaining capacity SOC2 of the high voltage battery 2 detected by a second remaining capacity detector 32.

Incidentally, the power supply device P thus configured cannot charge the low voltage battery 1 when an abnormality or a failure occurs in the DC-DC converter 7. Therefore, in this embodiment, when an abnormality or a failure occurs in the DC-DC converter 7, switching the changeover switch 40 allows the low voltage battery 1 to be charged. The following describes the charge control using the changeover switch 40 in this embodiment with reference to the flowchart illustrated in FIG. 3. It should be noted that the charge control of this embodiment is performed on the basis of a program preliminarily stored in the controller 20.

Figure 3:
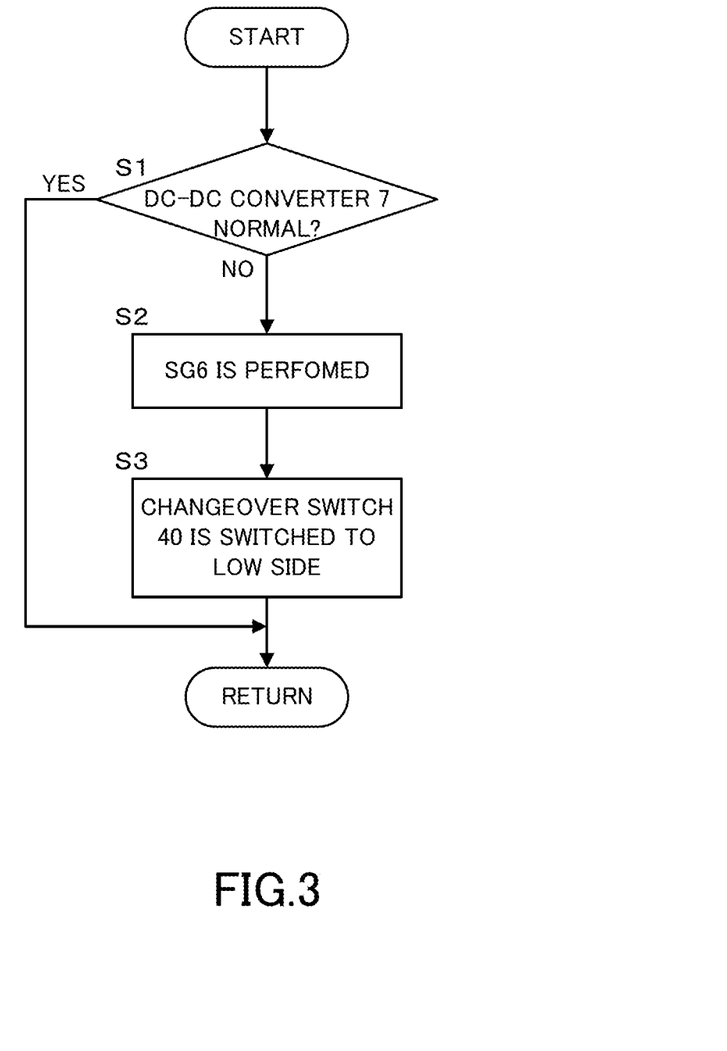
FIG. 3 is a flowchart illustrating a flow of control of a changeover switch according to the embodiment.

At Step S1, it is determined whether the DC-DC converter 7 is normal or not. Specifically, on the basis of, for example, an output voltage of the DC-DC converter 7, the controller 20 determines whether the DC-DC converter 7 is normal or not. When the DC-DC converter 7 is normal, the process proceeds to RETURN. When the DC-DC converter 7 is not normal, that is, an abnormality or a failure has occurred in the DC-DC converter 7, the process proceeds to Step S2. It should be noted that when an abnormality or a failure is determined to have occurred in the DC-DC converter 7, an alert notifying that an abnormality or a failure has occurred in the DC-DC converter 7 is displayed on a display device in the vehicle. It should be noted that the alert may be an alert sound, such as an alarm.

At Step S2, the electric generation control of the SG 6 is performed. Specifically, the controller 20 adjusts a field current of the SG 6 to adjust an output (generated electric power) of the SG 6 to be a value appropriate for the charge of the low voltage battery 1.

At Step S3, the changeover switch 40 is switched to LOW side. Specifically, the controller 20 switches the changeover switch 40 to a position for connecting the SG 6 to the low voltage battery 1. Accordingly, the electric power generated by the SG 6 is directly supplied to the low voltage battery 1 without via the DC-DC converter 7, and the low voltage battery 1 can be charged. In addition, the controller 20 performs the charge control (the electric generation control of the SG 6) of the low voltage battery 1 on the basis of the remaining capacity SOC1 of the low voltage battery 1 detected by the first remaining capacity detector 31.

Thus, in this embodiment, when an abnormality or a failure has occurred in the DC-DC converter 7, switching the changeover switch 40 to the LOW side and performing the electric generation control of the SG 6 allow the SG 6 to charge the low voltage battery 1 without via the DC-DC converter 7.

In addition, before the changeover switch 40 is switched to the LOW side, adjusting the output (generated electric power) of the SG 6 to the value appropriate for the charge of the low voltage battery 1 can avoid the application of an overvoltage and an overcurrent to the low voltage battery 1.

It should be noted that while a case where the SG 6 and the high voltage battery 2 are connected in a normal time in the above-described embodiment has been described as an example, the SG 6 and the low voltage battery 1 may be connected in the normal time. In this case, the electric power generated by the SG 6 in the normal time charges the high voltage battery 2 via the DC-DC converter 7. When an abnormality or a failure has occurred in the DC-DC converter 7, switching the changeover switch 40 to HIGH side and performing the electric generation control of the SG 6 allow the SG 6 to charge the high voltage battery 2 without via the DC-DC converter 7.

Figure 4:
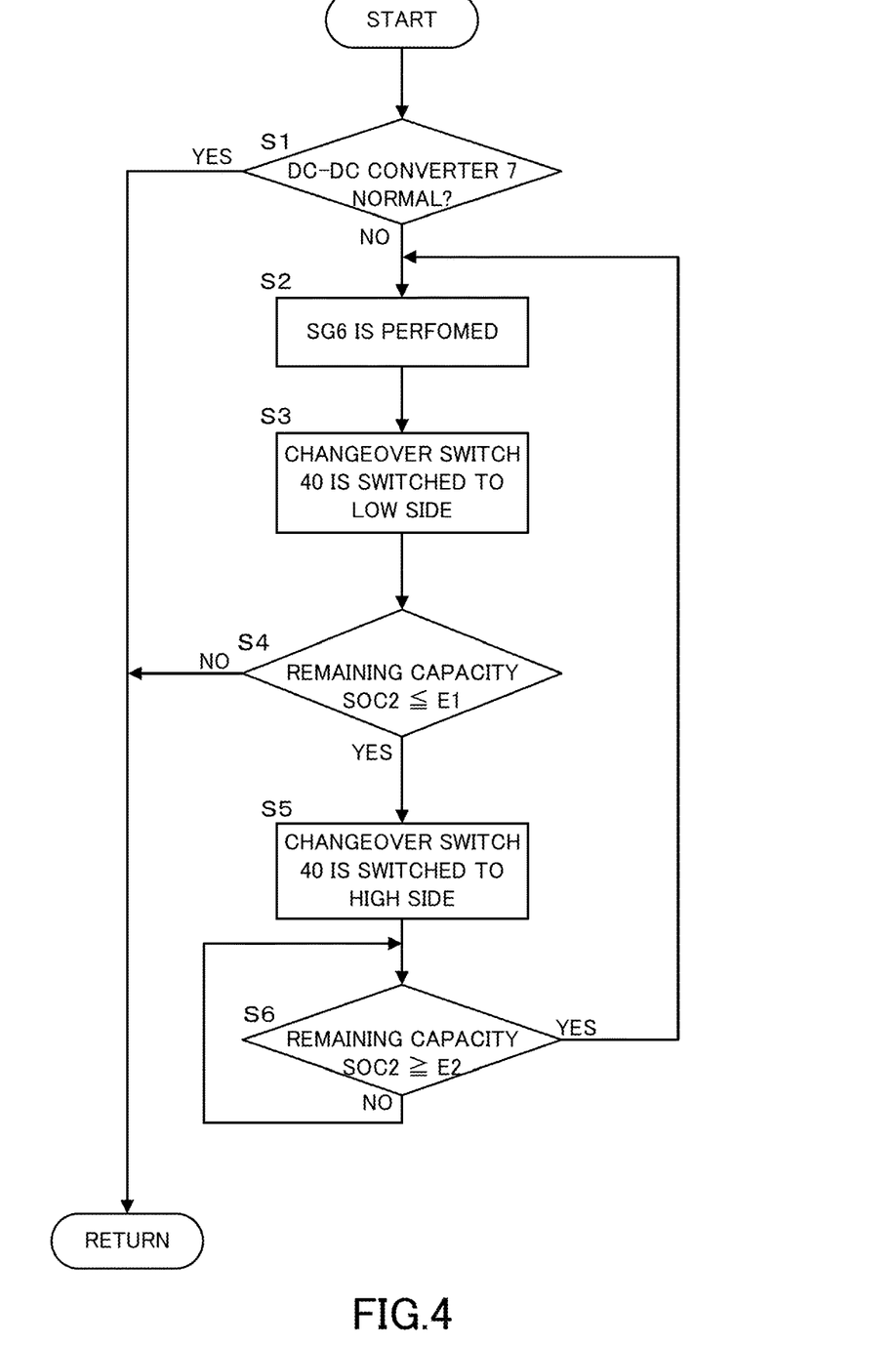
FIG. 4 is a flowchart illustrating a flow of control of a changeover switch according to a modification.

Next, with reference to FIG. 4, a modification of the charge control in this embodiment is described. In the modification illustrated in FIG. 4, the controller 20 further performs determinations and a control at Step S4 to Step S6 in addition to Step S1 to Step S3 in FIG. 3.

At Step S4, the controller 20 determines whether the remaining capacity SOC2 is equal to or less than a predetermined value E1 or not. Specifically, the controller 20 determines whether the remaining capacity SOC2 of the high voltage battery 2 detected by the second remaining capacity detector 32 is equal to or less than the predetermined value E1 or not. When the remaining capacity SOC2 is equal to or less than the predetermined value E1, the process proceeds to Step S5. When the remaining capacity SOC2 is larger than the predetermined value E1, the process proceeds to RETURN.

At Step S5, the changeover switch 40 is switched to the HIGH side. Specifically, the controller 20 switches the changeover switch 40 to a position for connecting the SG 6 to the high voltage battery 2. Accordingly, the electric power generated by the SG 6 is supplied to the high voltage battery 2, and the high voltage battery 2 is charged. At this time, the controller 20 adjusts the field current of the SG 6 to adjust the output (generated electric power) of the SG 6 to a value appropriate for the charge of the high voltage battery 2.

At Step S6, the controller 20 determines whether the charge of the high voltage battery 2 has been completed or not. Specifically, the controller 20 determines whether the remaining capacity SOC2 of the high voltage battery 2 detected by the second remaining capacity detector 32 is equal to or more than a predetermined value E2 or not. When the remaining capacity SOC2 of the high voltage battery 2 is equal to or more than the predetermined value E2, the process returns to Step S2, and the changeover switch 40 is switched to the LOW side again. In contrast, when the remaining capacity SOC2 of the high voltage battery 2 is less than the predetermined value E2, the determination at Step S6 is repeated until the remaining capacity SOC2 of the high voltage battery 2 becomes equal to or more than the predetermined value E2.

According to the above-described modification, when an abnormality or a failure has occurred in the DC-DC converter 7, the low voltage battery 1 can be charged, and the high voltage battery 2 can also be charged.

It should be noted that the charge control of the above-described embodiment is also applicable to a hybrid vehicle including a motor-generator. The following describes this modification with reference to FIG. 5.

Figure 5:
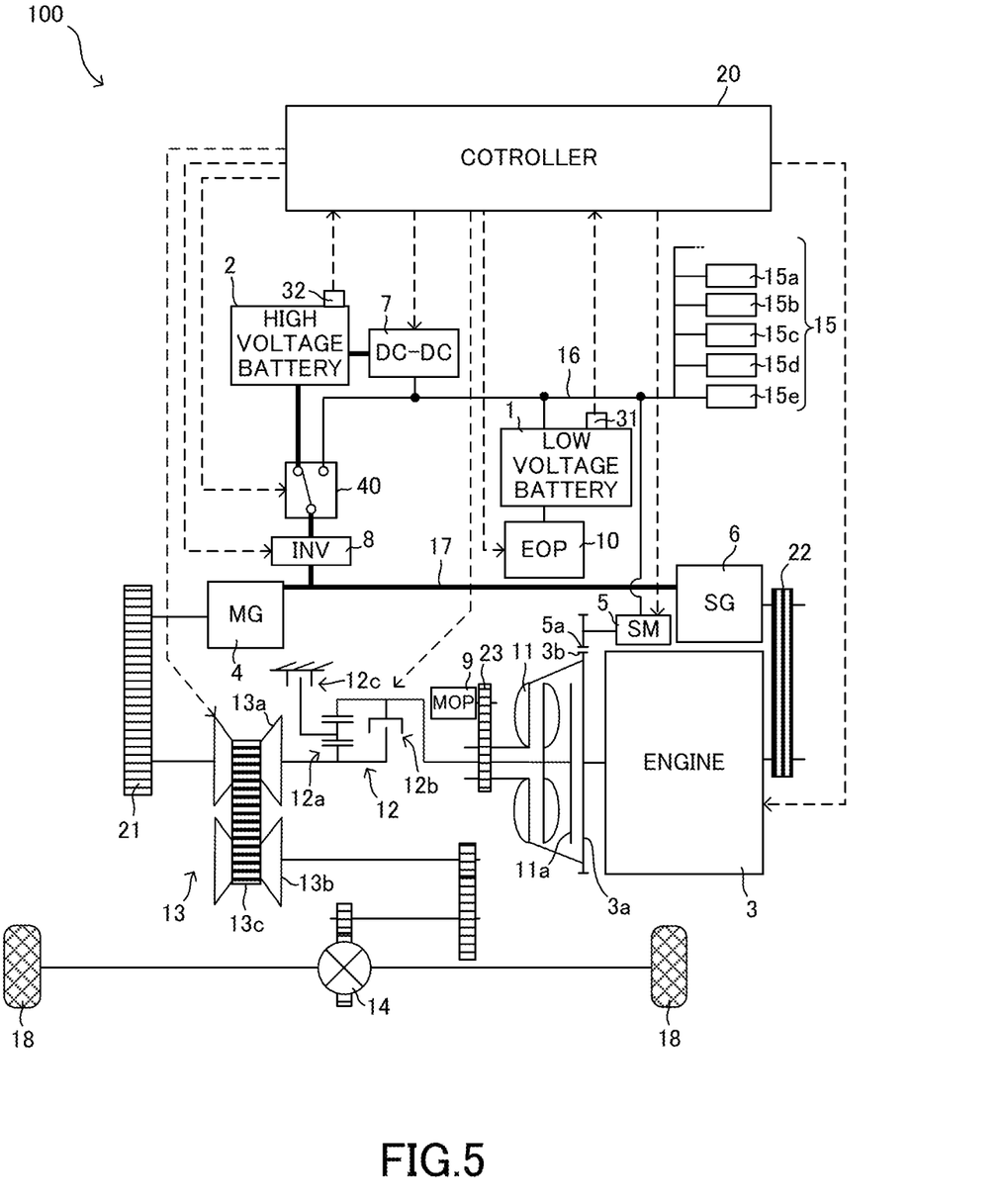
FIG. 5 is a schematic configuration diagram of a modification of the vehicle according to the embodiment.

The vehicle 100 illustrated in FIG. 5 further includes a motor-generator 4 (hereinafter referred to as "MG 4.") as a driving source for running. It should be noted that, in this modification, the MG 4 is included in the power supply device P.

The MG 4 is a synchronous rotating electrical machine in which a permanent magnet is embedded in a rotor, and a stator coil is wound around a stator. The MG 4 is connected to a shaft of the primary pulley 13a via a chain 21 wound between a sprocket disposed on a shaft of the MG 4 and a sprocket disposed on the shaft of the primary pulley 13a. The MG 4 is controlled by applying a three-phase alternating current generated by the inverter 8 on the basis of a command from the controller 20.

The MG 4 operates as an electric motor that receives the electric power supplied from the high voltage battery 2 to rotatably drive, thus generating a torque for driving the vehicle 100. In addition, the MG 4 functions as an electric generator that generates an electromotive force on both ends of the stator coil when the rotor receives the rotational energy from the engine 3 and the drive wheels 18, thus allowing the high voltage battery 2 to be charged via the inverter 8.

The sprocket disposed on the shaft of the MG 4 and the sprocket disposed on the shaft of the primary pulley 13a are configured such that the latter has more teeth (for example, the number of teeth=1:3), and an output rotation of the MG 4 is decelerated and transmitted to the primary pulley 13a. Accordingly, the torque required for the MG 4 is decreased to downsize the MG 4, and a degree of a flexible arrangement of the MG 4 is improved. It should be noted that a gear train may be used instead of the chain 21.

Thus, in this modification, the high voltage battery 2 can be charged by the MG 4. Accordingly, since decrease in the voltage of the high voltage battery 2 is suppressed, a frequency of switching the changeover switch 40 in order to charge the high voltage battery 2 can be reduced when an abnormality or a failure has occurred in the DC-DC converter 7.

Actions and effects of the above-described embodiment configured as described above are collectively described.

The power supply device P of this embodiment includes the low voltage battery 1, the high voltage battery 2, the rotating electrical machine (SG 6), the DC-DC converter 7, the changeover switch 40, and the controller 20. The low voltage battery 1 supplies an electric power to the electric component 15 mounted to the vehicle 100. The high voltage battery 2 is mounted to the vehicle 100 and has an output voltage higher than the output voltage of the low voltage battery 1. The rotating electrical machine (SG 6) receives a rotational energy from the engine 3 to generate the electric power for charging the low voltage battery 1 and the high voltage battery 2. The DC-DC converter 7 is disposed on an electric circuit connecting the low voltage battery 1 to the high voltage battery 2 and converts an input voltage and outputs the converted voltage. The changeover switch 40 switches a connection of the rotating electrical machine (SG 6) to the low voltage battery 1 and the high voltage battery 2. The controller 20 controls the rotating electrical machine (SG 6), the DC-DC converter 7, and the changeover switch 40. When the DC-DC converter 7 is normal, the controller 20 controls the changeover switch 40 to connect the rotating electrical machine (SG 6) to any one of the batteries of the low voltage battery 1 and the high voltage battery 2 and connects the other battery of the low voltage battery 1 and the high voltage battery 2 to the rotating electrical machine (SG 6) via the DC-DC converter 7. When an abnormality or a failure has occurred in the DC-DC converter 7, the controller 20 controls the changeover switch 40 to connect the rotating electrical machine (SG 6) to the other battery without via the DC-DC converter 7 and controls the output of the rotating electrical machine (SG 6) corresponding to the connected other battery.

According to this configuration, when an abnormality or a failure has occurred in the DC-DC converter 7, the rotating electrical machine (SG 6) and the other battery can be connected without via the DC-DC converter 7 by controlling the changeover switch 40. Furthermore, even when an abnormality or a failure has occurred in the DC-DC converter 7, the other battery can be charged by controlling the output of the rotating electrical machine (SG 6) corresponding to the connected other battery.

In addition, when the electric power is supplied from the low voltage battery 1 or the high voltage battery 2, the rotating electrical machine (SG 6) generates a torque for starting the engine 3 or assisting the driving of the engine 3.

Use of the SG 6 as the rotating electrical machine allows performing not only the electric generation, but also the quiet and smooth start without the mesh sound of the gears when the engine 3 is started.

The power supply device P further includes the motor-generator 4 that is allowed to generate the electric power for charging the low voltage battery 1 and the high voltage battery 2 when an input from the drive wheels 18 or the engine 3 is present. The motor-generator 4 generates a torque for driving the drive wheels 18 when the electric power is supplied from the high voltage battery 2.

The power supply device P is also applicable to a hybrid vehicle. When an abnormality or a failure has occurred in the DC-DC converter 7, the high voltage battery 2 can be charged by the motor-generator 4.

In a case which an abnormality has occurred in the DC-DC converter 7, when a remaining capacity of the one battery decreases to be a predetermined value or less, the controller 20 controls the changeover switch 40 to connect the rotating electrical machine (SG 6) to the one battery.

When an abnormality or a failure has occurred in the DC-DC converter 7, not only the other battery can be charged, but also the one battery can be charged.

In the power supply device P, the one battery is the high voltage battery 2, and the other battery is the low voltage battery 1.

In this case, when an abnormality or a failure has occurred in the DC-DC converter 7, since the electric power for charging the low voltage battery 1 is smaller than the electric power for charging the high voltage battery 2, an overload on the SG 6 is suppressed.

The embodiment of the present invention is described above. However, the above embodiment does not intend to limit the technical scope of the present invention to the specific configurations of the above embodiment but only indicates part of application examples of the present invention.

While in the above-described embodiment, as the rotating electrical machine, the SG 6 has been described as an example, the rotating electrical machine may be one that performs only electric generation.

Furthermore, the transmission may be, not only a continuously variable transmission, but also a stepped transmission.

This application claims priority based on Japanese Patent Application No. 2019-115815 filed with the Japan Patent Office on Jun. 21, 2019, the entire contents of which are incorporated into this specification.

The invention claimed is:

1. A power supply device for a vehicle, comprising:
a first battery configured to supply an electric power to an electric component mounted to the vehicle;
a second battery mounted to the vehicle, the second battery having an output voltage higher than an output voltage of the first battery;
a rotating electrical machine configured to receive a rotational energy from an engine to be configured to generate an electric power for charging the first battery and the second battery;
a DC-DC converter disposed on an electric circuit connecting the first battery to the second battery, the DC-DC converter being configured to convert an input voltage and output the converted voltage;
a changeover device configured to switch a connection of the rotating electrical machine to the first battery and the second battery; and a control device configured to control the rotating electrical machine, the DC-DC converter, and the changeover device, wherein when the DC-DC converter is normal, the control device controls the changeover device to connect the rotating electrical machine to the second battery and connects the first battery to the rotating electrical machine via the DC-DC converter, when an abnormality or a failure has occurred in the DC-DC converter, the control device controls the changeover device to connect the rotating electrical machine to the first battery not via the DC-DC converter and controls a generated output of the rotating electrical machine corresponding to the connected first battery, and in a case in which the abnormality has occurred in the DC-DC converter, when a remaining capacity of the second battery decreases to be a predetermined value or less, the control device controls the changeover device to connect the rotating electrical machine to the second battery.

2. The power supply device for the vehicle according to claim 1, wherein
when an electric power is supplied from the first battery or the second battery, the rotating electrical machine generates a torque for starting the engine or assisting driving of the engine.

3. The power supply device for the vehicle according to claim 1, further comprising
a motor-generator that is configured to generate an electric power for charging the first battery and the second battery when an input from drive wheels or the engine is present, the motor-generator generating a torque for driving the drive wheels when an electric power is supplied from the second battery.

4. The power supply device of claim 1, wherein in the case in which the abnormality has occurred in the DC-DC converter, when the remaining capacity of the second battery decreases to be the predetermined value or less, the control device further controls the generated output, which is a generated electrical power of the rotating electrical machine corresponding to the connected second battery.

5. A control method for a power supply device for a vehicle, the control method controlling the power supply device for the vehicle, wherein
the power supply device for the vehicle includes:
a first battery configured to supply an electric power to an electric component mounted to the vehicle;
a second battery mounted to the vehicle, the second battery having an output voltage higher than an output voltage of the first battery;
a rotating electrical machine configured to receive a rotational energy from an engine to be configured to generate an electric power for charging the first battery and the second battery;
a DC-DC converter disposed on an electric circuit connecting the first battery to the second battery, the DC-DC converter being configured to convert an input voltage and output the converted voltage; and
a changeover device configured to switch a connection of the rotating electrical machine to the first battery and the second battery, and
the control method comprises:
when the DC-DC converter is normal, controlling the changeover device to connect the rotating electrical machine to the second battery and connecting the first battery to the rotating electrical machine via the DC-DC converter;
when an abnormality or a failure has occurred in the DC-DC converter, controlling the changeover device to connect the rotating electrical machine to the first battery not via the DC-DC converter and controlling a generated output of the rotating electrical machine corresponding to the connected first battery; and
in a case in which the abnormality has occurred in the DC-DC converter, when a remaining capacity of the second battery decreases to be a predetermined value or less, controlling the changeover device to connect the rotating electrical machine to the second battery.

* * * * *